(12) United States Patent
Joshi et al.

(10) Patent No.: US 8,682,898 B2
(45) Date of Patent: Mar. 25, 2014

(54) SYSTEMS AND METHODS FOR DISCOVERING SYNONYMOUS ELEMENTS USING CONTEXT OVER MULTIPLE SIMILAR ADDRESSES

(75) Inventors: Sachindra Joshi, New Delhi (IN); Tanveer Faruquie, New Delhi (IN); Hima Prasad Karanam, New Delhi (IN); Marvin Mendelssohn, Melrose, MA (US); Mukesh Kumar Mohania, Rajpur Chungi (IN); Angel Marie Smith, Pepperell, MA (US); L Venkata Subramaniam, Gurgaon (IN); Girish Venkatachaliah, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 255 days.

(21) Appl. No.: 12/771,543

(22) Filed: Apr. 30, 2010

(65) Prior Publication Data

US 2011/0270808 A1  Nov. 3, 2011

(51) Int. Cl.
*G06F 7/00* (2006.01)
*G06F 17/00* (2006.01)

(52) U.S. Cl.
USPC .......................................................... 707/737

(58) Field of Classification Search
USPC .......................................................... 707/737
See application file for complete search history.

(56) References Cited

U.S. PATENT DOCUMENTS

| | | | |
|---|---|---|---|
| 5,303,149 A | 4/1994 | Janigian | |
| 5,799,302 A | 8/1998 | Johnson et al. | |
| 6,999,975 B1* | 2/2006 | Garrean | 1/1 |
| 2002/0078024 A1* | 6/2002 | Bellamy et al. | 707/1 |
| 2002/0103893 A1* | 8/2002 | Frelechoux et al. | 709/223 |
| 2004/0225543 A1* | 11/2004 | Kapochunas et al. | 705/7 |
| 2005/0060332 A1* | 3/2005 | Bernstein et al. | 707/100 |
| 2005/0114324 A1* | 5/2005 | Mayer | 707/3 |
| 2005/0177563 A1* | 8/2005 | Bellamy et al. | 707/3 |
| 2006/0095521 A1* | 5/2006 | Patinkin | 709/206 |
| 2008/0319941 A1* | 12/2008 | Gollapudi | 707/2 |
| 2009/0043797 A1* | 2/2009 | Dorie et al. | 707/101 |
| 2009/0248608 A1* | 10/2009 | Ravikumar et al. | 706/55 |
| 2009/0287742 A1 | 11/2009 | Woolston et al. | |
| 2011/0213727 A1* | 9/2011 | Gullo et al. | 705/335 |
| 2011/0270808 A1* | 11/2011 | Faruquie et al. | 707/692 |

FOREIGN PATENT DOCUMENTS

CA  2110145  5/1994

OTHER PUBLICATIONS

Monge, Alvaro E., "An Adaptive and Efficient Algorithm for Detecting Approximately Duplicate Database Records", California State University, Long Beach, California, Jun. 9, 2000.

(Continued)

*Primary Examiner* — Tony Mahmoudi
*Assistant Examiner* — Muluemebet Gurmu
(74) *Attorney, Agent, or Firm* — Ference & Associates LLC (57) ABSTRACT

A clustering-based approach to data standardization is provided. Certain embodiments take as input a plurality of addresses, identify one or more features of the addresses, cluster the addresses based on the one or more features, utilize the cluster(s) to provide a data-based context useful in identifying one or more synonyms for elements contained in the address(es), and standardize the address(es) to an acceptable format, with one or more synonyms and/or other elements being added to or taken away from the input address(es) as part of the standardization process.

20 Claims, 6 Drawing Sheets

Spelling Variations, Hyphenation, Style Variations, Abbreviations:

| I-344 | Sarojini Nagar | N Delhi | 23 |
|---|---|---|---|
| 344 I Block | Sarojni Ngr | New Delhi | 110023 |
| 344 Block I | SN | New Delhi | 110023 |

→ Address
→ Element

Multiple Ways of Writing the Same Address Field

| 13B | Link Road | Versova | Mumbai |
|---|---|---|---|
| 13 Block M | Bandra Versova Link Rd. | Versova | Mumbai |

Missing Address Fields

| 4, Block C | ISID Campus | | V. Kunj | New Delhi | 110070 |
|---|---|---|---|---|---|
| 4C | ISID Campus | Institutional Area | V. Kunj | New Delhi | 110070 |

Address Mistakes

| 4C | ISID Campus | Institutional Area | V. Kunj | New Delhi | 110007 |
|---|---|---|---|---|---|

↗ Wrong Pin

(56) References Cited

OTHER PUBLICATIONS

Costa, Gianni: Manco, Giuseppe; and Ortale, Riccardo, "An incremental clustering scheme for data de-duplication", http://www.springerlink.com/content/k73p346831034777/, published online: Oct. 28, 2009.

"Data Quality: Name and Address Cleansing", http://download.oracle.com/docs/html/B10657_01/19dataqu.htm, available online as of Jul. 12, 20009.

Lyon, Jody, "Customer Data Quality: Building the Foundation for a One-to-One Customer Relationship", Journal of Data Warehousing, vol. 3, No. 2, Summer 1998.

"Get your addresses cleaner than ever.", PitneyBowes product brochure, http://www.pbdmt.com/solutions/OnlineBrochures/322014_Finalist.pdf.

Beg, Javed and Hussain, Shadab, "Data Quality—A problem and An Approach", White Paper, Wipro Technologies, http://www.cio-leader.com/Data%20Quality%20-%20A%20Problem%20%20An%20Approach.pdf.

"IBM WebSphere QualityState Version 7.5", WebSphere software, Copyright IBM Corporation 2005, http://www.ibm.com/software/data/integration.

* cited by examiner

Spelling Variations, Hyphenation, Style Variations, Abbreviations:

| I-344 | Sarojini Nagar | N Delhi | 23 |
|---|---|---|---|
| 344 I Block | Sarojni Ngr | New Delhi | 110023 |
| 344 Block I | SN | New Delhi | 110023 |

(Address → first row; Element → last cell 110023)

Multiple Ways of Writing the Same Address Field

| 13B | Link Road | Versova | Mumbai |
|---|---|---|---|
| 13 Block M | Bandra Versova Link Rd. | Versova | Mumbai |

Missing Address Fields

| 4, Block C | ISID Campus | | V. Kunj | New Delhi | 110070 |
|---|---|---|---|---|---|
| 4C | ISID Campus | Institutional Area | V. Kunj | New Delhi | 110070 |

Address Mistakes

| 4C | ISID Campus | Institutional Area | V. Kunj | New Delhi | 110007 |
|---|---|---|---|---|---|

(Wrong Pin → 110007)

SYSTEMS AND METHODS FOR DISCOVERING SYNONYMOUS ELEMENTS USING CONTEXT OVER MULTIPLE SIMILAR ADDRESSES

BACKGROUND

The subject matter described herein generally relates to managing data quality and cleansing data. Certain subject matter presented herein relates to synonym identification and standardization of addresses.

Existing data management and cleansing tools help organizations ensure that their strategic systems, including data warehouses, deliver accurate, complete information to business users across the enterprise. Equipped with trusted information, organizations can make more timely and better informed decisions. Existing tools include for example a graphical user interface (GUI) and capabilities that can be customized into specific business rules, offer some control over international names, addresses, phone numbers, birth dates, email addresses, and other descriptive fields. Existing tools are designed to discover relationships among database entries in an enterprise and Internet environment, both in batch mode and in real-time.

Using existing tools, companies hope to gain access to accurate, consistent, consolidated views of any individual or business entity and its relationships. Data from disparate sources can be standardized into fixed fields using business driven rules to assign the correct semantic meaning to input data in order to facilitate matching. Once standardized, matching capabilities are employed to detect duplication and other relationships in the data despite anomalous, inconsistent, and/or missing data values. A statistical matching engine can, for example, assess the probability that two or more sets of data values refer to the same business entity, providing more accurate match results.

BRIEF SUMMARY

Embodiments of the invention broadly contemplate systems, methods, apparatuses and program products configured to provide a clustering-based approach to data standardization. Certain embodiments take as input a plurality of addresses, identify one or more features of the addresses, cluster the addresses based on the one or more features, utilize the cluster(s) to provide a data-based context useful in identifying one or more synonyms for elements contained in the address(es), and standardize the address(es) to an acceptable format, with one or more synonyms and/or other elements being added to or taken away from the input address(es) as part of the standardization process. Certain embodiments supplement dictionaries to enrich the dictionaries with additional synonyms discovered based on the clustering process employed. Certain embodiments also provide data management functionality, such as address de-duplication.

In summary, one aspect provides a method comprising: accessing a database having addresses stored therein; in response to accessing the database: clustering a plurality of the addresses; and identifying one or more synonyms for one or more components of addresses belonging to a cluster of addresses; and standardizing the cluster of addresses.

Another aspect provides a computer program product comprising: a computer readable storage medium having computer readable program code embodied therewith, the computer readable program code comprising: computer readable program code configured to access a database having addresses stored therein; computer readable program code configured to, in response to accessing the database: cluster a plurality of the addresses; and identify one or more synonyms for one or more components of addresses belonging to a cluster of addresses; and computer readable program code configured to standardize the cluster of addresses.

A further aspect provides an apparatus comprising: one or more processors; and a memory operatively connected to the one or more processors; wherein, responsive to execution of computer readable program code accessible to the one or more processors, the one or more processors are configured to: access a database having a plurality of addresses stored therein; in response to accessing the database: cluster the plurality of addresses; and identify one or more synonyms for one or more components of addresses belonging to a cluster of addresses; and standardize the cluster of addresses.

The foregoing is a summary. For a better understanding of exemplary embodiments, together with other and further features and advantages thereof, reference is made to the following description, taken in conjunction with the accompanying drawings, and the scope of the invention will be pointed out in the appended claims.

DETAILED DESCRIPTION

It will be readily understood that components of the embodiments, as generally described and illustrated in the figures herein, may be arranged and designed in a wide variety of different configurations in addition to the described example embodiments. Thus, the following more detailed description of embodiments, as represented in the figures, is not intended to limit the scope of the invention, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that various embodiments can be practiced without one or more of the specific details, or with other methods, components, materials, et cetera. In other instances, well-known structures, materials, or operations are not shown or described in detail to avoid obfuscation.

As used herein, an address includes a postal address from any geographic location. "Elementization" of an address as used herein includes the process of identifying elements (components or constituent parts) of an address. Standardization as used herein includes applying a standardized identifier (for example, a name) for a particular component or element of an address. De-duplication as used herein includes consolidating redundant addresses. Address cleaning or cleansing as used herein includes address elementization, standardization and de-duplication.

Various embodiments provide a data-driven approach to finding address element synonymy. Once identified, synonymous address elements are useful, among other reasons, for address cleansing of data warehouses. Finding variants of address elements ("synonyms") allows, among other things, filling in of missing values in addresses, correcting wrong entries, and completing otherwise deficient address entries. As briefly outlined above, existing tools for address cleaning exist. However, existing tools utilize solutions focusing on word pattern frequencies and word frequencies, but do not give a view of the different ways in which address elements appear in a given data context. As such, existing tools for address cleansing rely on manual intervention and supplementing/enriching of dictionaries when a new or unusual variant of an address element or sequencing thereof is encountered.

A core idea underlying certain embodiments is using near duplicate and neighboring addresses to do missing value filling, address correction and/or address completion. Existing solutions do not take care of this problem, particularly considering more complex addresses, such as found certain geographic areas (for example, Indian), where an accepted, standardized and well structured addressing format has not been established and/or is not commonly adhered to. Thus, in several geographies there is no standard way of writing addresses, which confounds existing address cleansing tools reliant on pre-determined dictionaries.

Frequent element spelling variation, element abbreviation, incorrect representation of an element (including out of order sequencing of elements), inclusion of a landmark element, and missing address elements all tend to complicate addresses from certain geographic locations (for example, India) as compared to addresses found in other geographic locations (for example, the United States). Part of this observed address complication may be attributable to language differences (for example, in India, it is commonplace to represent Hindi words in English); whereas part of this observed address complication is perhaps attributable to differences in accepted address structural conventions. For example, it is common for an Indian address to include a landmark element (as in "near XYZ bank" or "opposite ABC school"). In any event, the result is that for certain geographies sophisticated and/or non-standard addresses are commonly employed.

It has been discovered that existing tools that utilize dictionaries having comprehensive lists of street names, area names, acceptable address structure (for example, sequence of elements), et cetera, are not useful for certain types of addresses, as exhaustive dictionaries simply do not exist for particular geographic locations. Thus, matching a variant of an address element or sequence thereof to an accepted standard address element or sequence thereof is impossible in many cases for these complex addresses. Regarding the sequencing of address elements, for example, in India, it is somewhat common for more specific address information (house number and the like) to appear first; however, this addressing scheme is not strictly followed, as often individuals will list less specific information (city names and the like) first. Such lack of standardization complicates the analysis of addresses, making the accuracy of existing tools for address cleansing very low and thus rarely utilized for complex addresses. This creates a costly business problem, as wrong address information results in huge losses for businesses. Thus, a viable solution for address cleansing is needed.

The description now turns to the figures. The illustrated embodiments will be best understood by reference to the figures. The following description is intended only by way of example and simply illustrates certain selected example embodiments representative of the invention, as claimed.

It should be noted that the flowchart and block diagrams in the figures illustrate the architecture, functionality, and operation of possible implementations of systems, apparatuses, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1A:
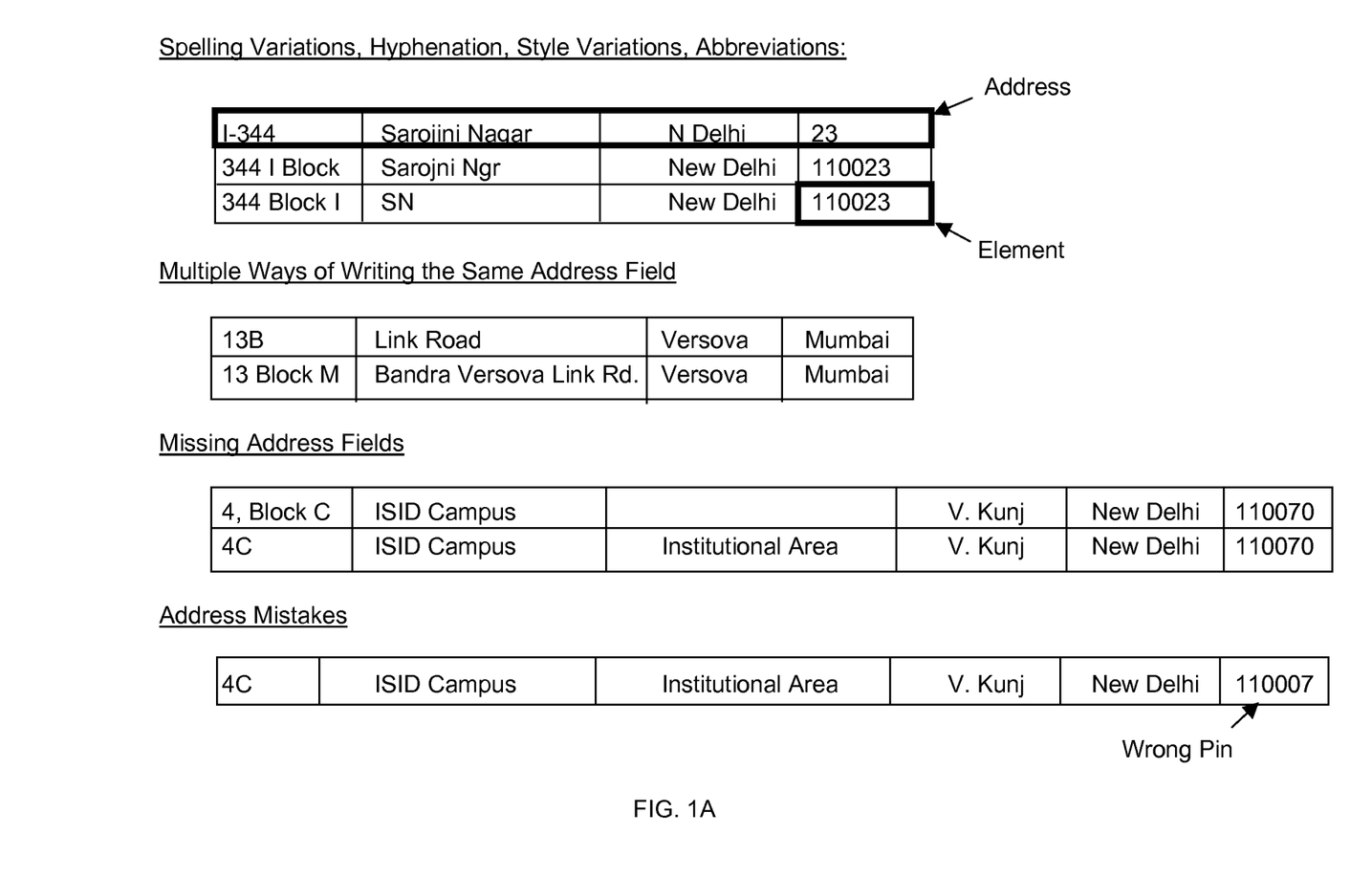
FIG. 1A illustrates example addresses and elements thereof.

Referring to FIG. 1A, example non-standard addresses and typical issues associated therewith are illustrated. The addresses are composed of elements. The elements illustrated in FIG. 1A, by way of example, include house numbers, areas, roads, cities, states, and pin numbers. Other elements are often included in certain geographies, such as a landmark element (as discussed further herein).

As discussed herein, addresses from certain geographies tend to be more complex. Certain complexities are illustrated in FIG. 1A as examples. For example, in India, addresses often contain spelling variations, hyphenation, style variations, and abbreviations. Still further, these addresses often contain multiple ways of writing the same address field, have missing elements, and even contain address mistakes, such as a wrong pin number being used. As mentioned herein, it is not uncommon for the sequential appearance of address elements (house number, area . . . pin) to vary.

Figure 1B:
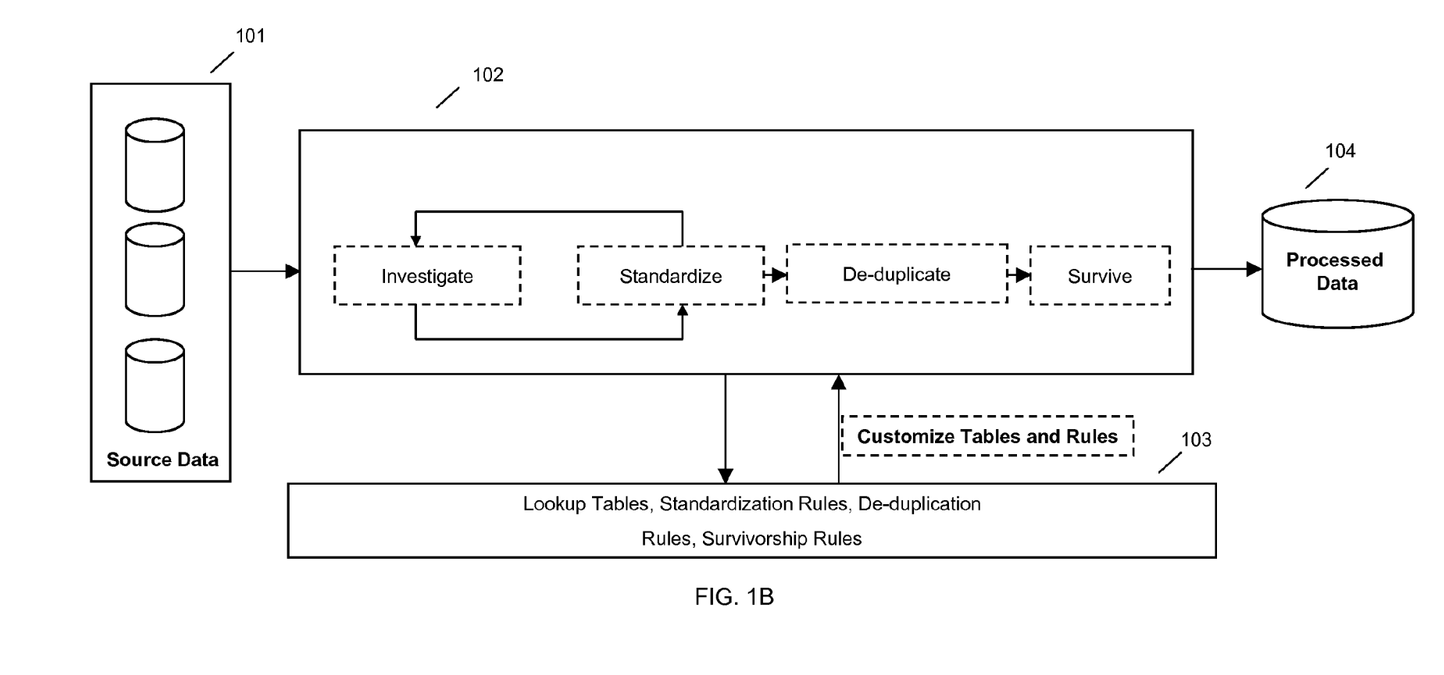
FIG. 1B illustrates an example architecture of an address cleansing system.

Turning to FIG. 1B, an example of a conventional address cleansing system is illustrated. Source data (for example, addresses) from one or more sources 101 is input into an analysis component 102. The input addresses are first subjected to an investigation stage, which includes for example elementization of the addresses. That is, during investigation, the addresses are parsed to identify their constituent parts (elements). Following the investigation stage, a standardization process is applied. For example, a dictionary 103 is consulted to identify a standard to be applied to a particular identified element. By way of example, a standardization process may include changing an abbreviated element from "ST" to "Street" or "AVE" to "AVENUE". A typical rule included in the dictionary is for example "any word appearing immediately prior to AVE or AVENUE=avenue name". The standardization and investigation processes can loop or be repeated, as completing one step often aids another, and further refinement can be had.

Following the standardization, de-duplication takes place. De-duplication, as discussed herein, includes taking standardized addresses and computing a similarity metric. If two addresses are considered similar based on a predetermined threshold for the similarity metric, one of the addresses considered similar is selected as a representative address and survives, being placed into processed data storage 104.

In a conventional address cleansing approach, raw addresses are input to a system component that consults a dictionary to place the addresses in some semi-standardized form. The dictionary contains standard forms for addresses and a non-exhaustive list of synonyms. The input addresses then have certain terms corrected using a dictionary lookup, which is often supplemented by manual lookup and replacement of certain terms with accepted synonyms not in the dictionary. The result of this process is the production of semi-standardized addresses. These semi-standardized addresses can then be merged and stored. Any new synonyms found manually can be entered into the dictionary to produce an enriched dictionary. The manual lookup of synonyms is necessitated by the fact that the dictionaries are not exhaustive and certain errors will be encountered when handling terms of an address. Without any contextual information to facilitate synonym identification, these errors are often returned as un-handled parts of an address that must be manually dealt with. Once dealt with manually, the fixes can be added to the dictionary.

Figure 2:
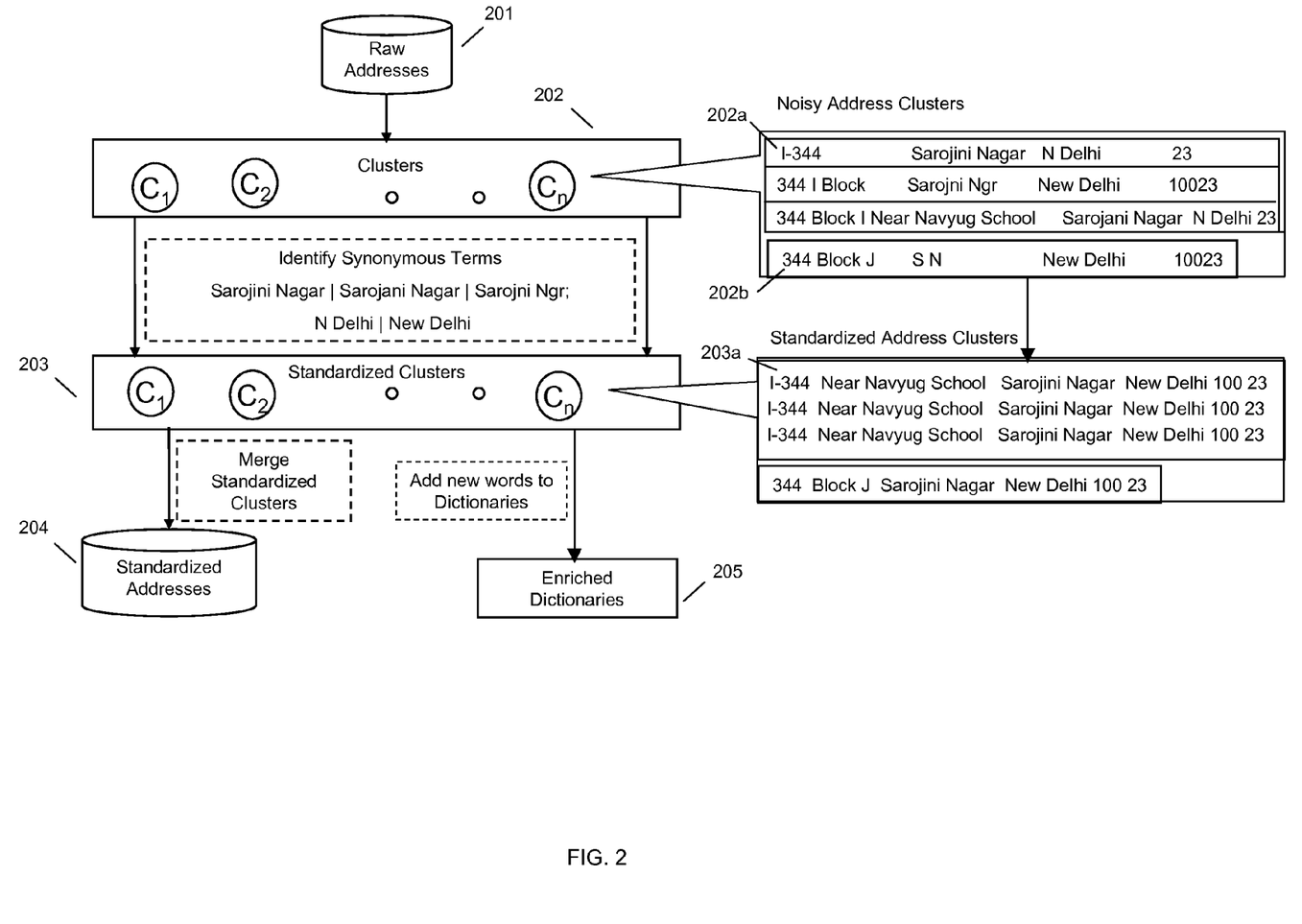
FIG. 2 illustrates an example clustering-based address cleansing approach.

Referring now to FIG. 2, a clustering based approach is illustrated. Rather than performing elementization followed by standardization and de-duplication, as per existing address cleansing tools, certain embodiments first cluster the raw addresses 201 based on some feature(s). Applying a clustering process to the addresses allows clusters of like addresses to be produced such that a data-based context is present for facilitating finding of synonyms.

The features used for clustering can include for example signatures from a shingling process, as described further herein. Clustering can be used to ensure that addresses that are near duplicates of one another are placed in or belong to the same cluster. For example, the addresses in cluster 202*a* are near duplicates of one another, whereas the address placed in cluster 202*b* is not sufficiently related/similar to the addresses of cluster 202*a* to be cluster with them. The clustered addresses 202 can be characterized as noisy clusters, as the addresses belonging thereto maintain the variations, mistakes, omissions, et cetera of the raw addresses. The addresses of a noisy cluster, for example 202*a*, are then used to find synonyms for the elements thereof using a difference operation.

Therefore, for each cluster, each pair of addresses is examined in order to determine how the addresses differ from one another. This gives rise to finding synonymous ways of referencing the same term within an element, as each address in the cluster may contain a different variation for a given term, and also provides other useful information, such as identifying missing elements in a given address entry. Once synonyms are identified for the clustered addresses, the addresses of a cluster can be standardized. For example, the near duplicate addresses of the noisy cluster 202*a* can be standardized using one or more synonyms to a standardized cluster 203*a*. The particular format for the standardized address can be modulated as desired. By way of example, in the standardized address 203*a*, it was considered desirable to incorporate the landmark element "Near Navyug School" as part of the standard address and thus this was considered a missing element or value in the other addresses of the noisy cluster 202*a*. Determining whether an element is a missing element or a landmark element (and like issues) can be implemented, for example, as a prompt for manual intervention in order to process the decision; however, this process can be automated by employing a standard or rule applied during an elementization process ran after standardization (for example, via consulting a dictionary containing a set or rules). A standardized cluster can thereafter be merged and standardized addresses stored in a database 204, and a dictionary 205 can be enriched with the synonyms identified for the cluster for future reference and use.

Figure 3:
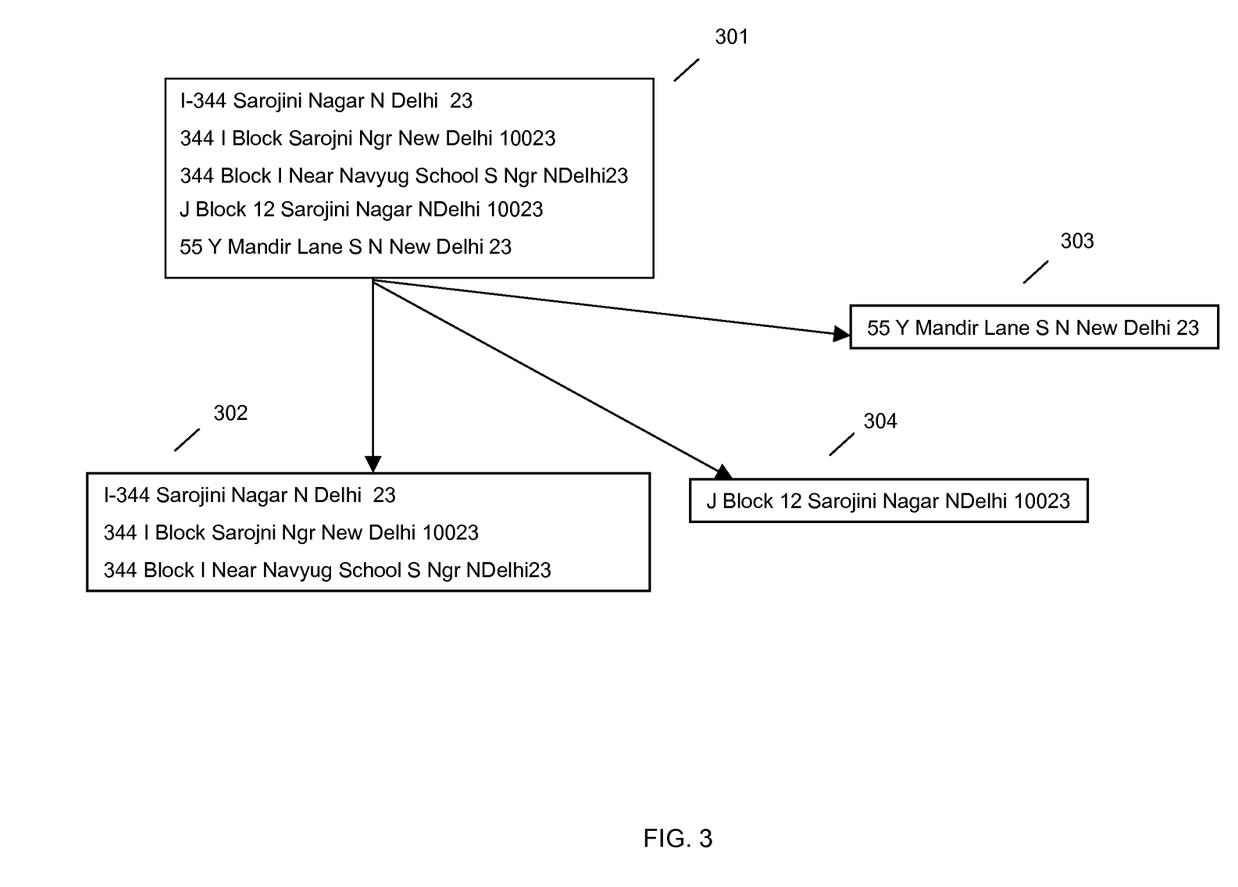
FIG. 3 illustrates an example of address clustering.

Turning to FIG. 3, an example of clustering is illustrated. The overall goal of clustering is to take a set of raw addresses 301 and separate them into clusters 302, 303 and 304 to facilitate finding of synonyms using cluster-specific information. A cluster should contain all near duplicate addresses of a particular kind from the initial set 301, with each cluster 302, 303, and 304 representing a distinct addressable entity. By way of example, cluster 302 contains three near duplicate entries for a single addressable entity. The variants of cluster 302 are used to identify synonyms for the elements of the addressable entity.

Figure 4:
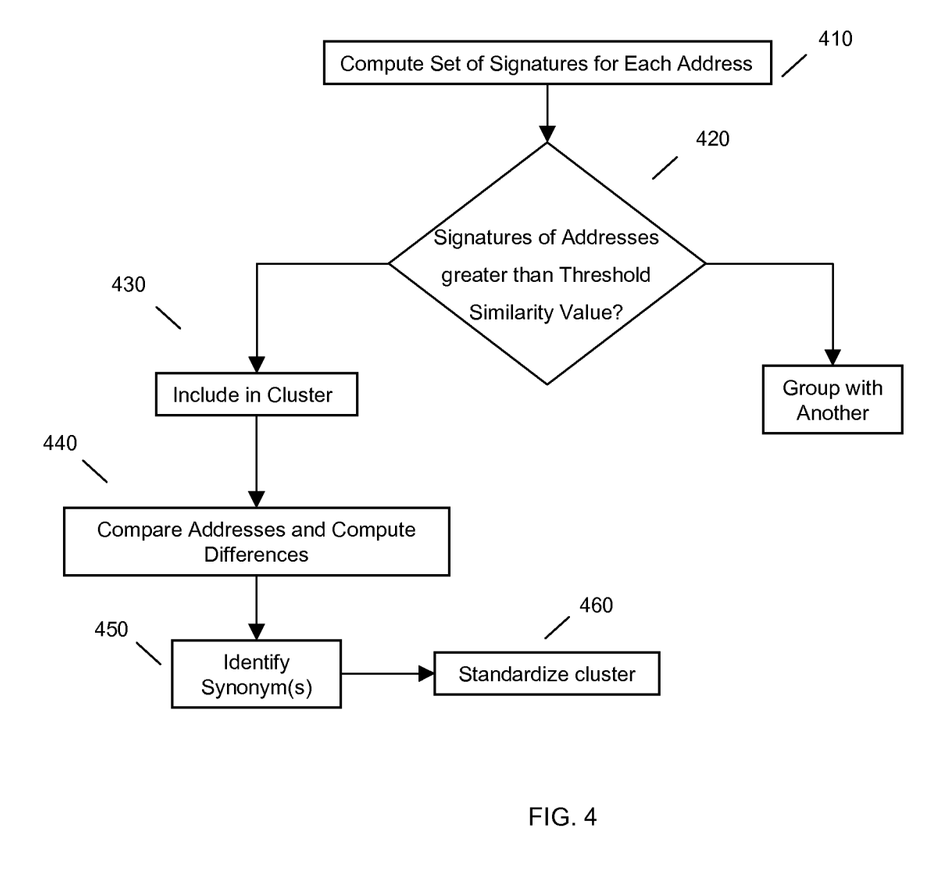
FIG. 4 illustrates an example of address clustering and standardization.

In FIG. 4, an example of clustering and standardization is illustrated. To perform clustering one of any number of clustering methods can be employed. One example of a clustering method is shingling, where shingles are first produced with a moving window to identify a set of signatures (shingles) 410 for an address. Shingling can be used to detect near duplicates on the raw addresses. For example, 4 length shingles in the word shingles are "shin", "hin$_g$", "ingl", "ngle" and "gles". Shingle length can be varied, with shorter shingle lengths typically being used for noisy data. For each address in a set of raw addresses 401, a set of signatures can be computed, for example 10 signatures based on the shingling method. Signatures capture sequence of n length character windows. It can then be determined if addresses share a threshold level of similarity 420. Two addresses that share at least some threshold number of n length character windows can be grouped together in a cluster 430. All the addresses that have at least some k signatures in common can belong to the same cluster. For every cluster, each pair of addresses can be compared and the difference(s) computed 440 using a word-based difference algorithm. One or more synonyms are then identified for terms used in the addresses of a given cluster 450. Thereafter, dictionaries can be enriched and each cluster of addresses standardized by employing one or more of the synonyms, filling in missing terms, and the like 460.

Clustering can happen at different granularities. For example, clustering on elements appearing on the right most elements of an address will often result in larger/courser clusters (clusters of area); whereas clustering on complete addresses often results in members that are variants of the same address (clusters of households). Moreover, incorporating one or more rules for similarity that go beyond the textual similarity noted above can enhance the clustering method. For example, an additional similarity rule can include "street or lane or gully or road=street name marker=similar". Such additional similarity rules, which can be characterized as capturing known synonyms, can enhance identification of similar addresses to be included in a cluster of addresses.

As discussed herein, once a standardized cluster has been produced, the addresses of the standardized cluster can be managed as appropriate. For example, the addresses of a standardized cluster represent a single addressable entity, which can be subjected to elementization, standardization and de-duplication to identify a surviving address for storage. Using a clustering based approach to identify synonyms, enrich dictionaries with additional variants/synonyms, and standardize the addresses leads to increased accuracy and performance of a cleansing tool when compared with existing/conventional cleansing tools. The following are example results from initial testing comparing a clustering based approach consistent with embodiments and an existing/conventional approach.

Standardization Results:

|  | Precision | Recall |
|---|---|---|
| Existing Approach | 33% | 33% |
| Clustering-Based Approach | 60% | 76% |

De-Duplication Results:

|  | Precision | Recall |
|---|---|---|
| Existing Approach | 50% | 62% |
| Clustering-Based Approach | 62% | 81% |

Figure 5:
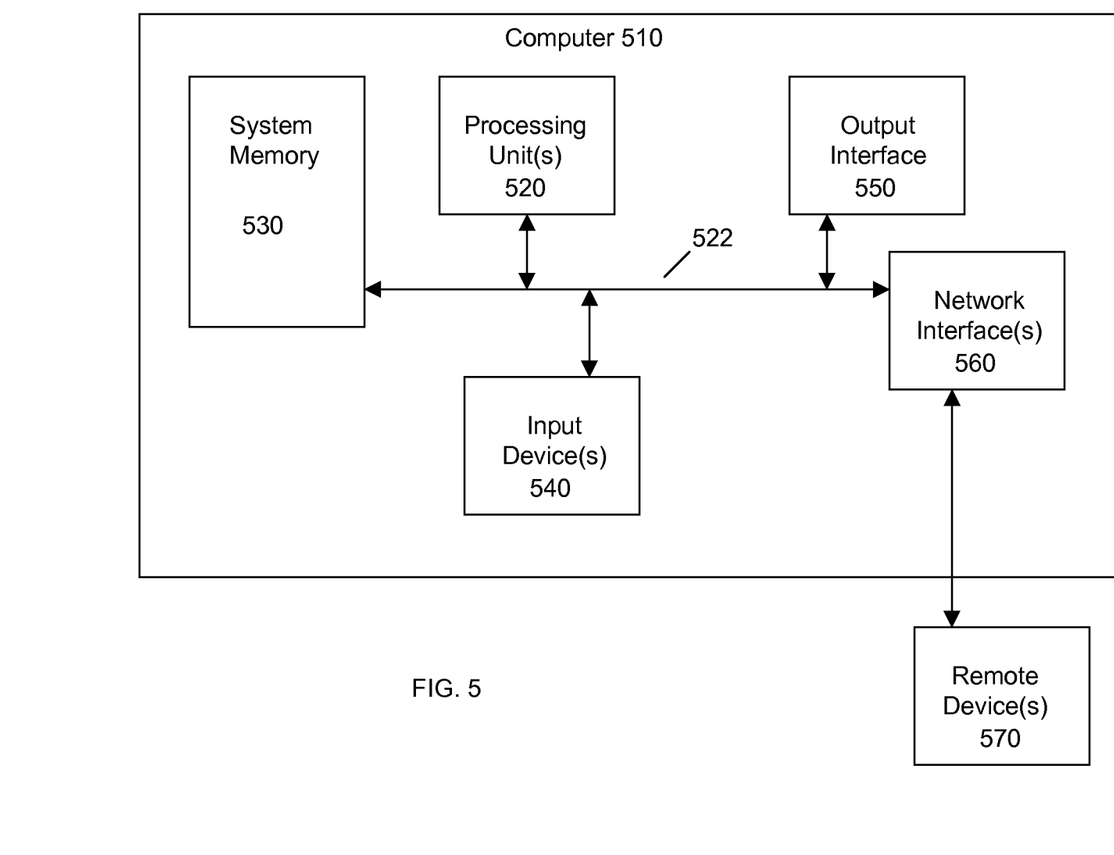
FIG. 5 illustrates an example computer system.

Turning to FIG. 5, it will be readily understood that certain embodiments can be implemented using any of a wide variety of devices. An example device that may be used in implementing one or more embodiments includes a computing device in the form of a computer 510. In this regard, the computer 510 may execute program instructions configured to cluster addresses and perform other functionality of an address cleansing system, as described herein.

Components of computer 510 may include, but are not limited to, a processing unit 520, a system memory 530, and a system bus 522 that couples various system components including the system memory 530 to the processing unit 520. Computer 510 may include or have access to a variety of computer readable media. The system memory 530 may include computer readable storage media in the form of volatile and/or nonvolatile memory such as read only memory (ROM) and/or random access memory (RAM). By way of example, and not limitation, system memory 530 may also include an operating system, application programs, other program modules, and program data.

A user can interface with (e.g. enter commands and information) the computer 510 through input devices 540. A monitor or other type of device can also be connected to the system bus 522 via an interface, such as an output interface 550. In addition to a monitor, computers may also include other peripheral output devices. The computer 510 may operate in a networked or distributed environment using logical connections to one or more other remote computers or databases, such as databases storing raw addresses. The logical connections may include a network, such local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    accessing a database having postal addresses stored therein on a computer readable storage medium;
    in response to accessing the database:
        clustering a plurality of the postal addresses based on similarity, and thereby forming at least one cluster of postal addresses; and
        within an identified cluster of postal addresses, identifying one or more synonyms relative to one or more components of postal addresses, wherein the one or synonyms comprise variants of the one or more components; and
        with respect to one or more components of the postal addresses in the identified cluster of postal addresses, identifying a standardized identifier from among the one or more synonyms and applying the standardized identifier to postal addresses within the cluster of postal addresses.

2. The method according to claim 1, wherein clustering the plurality of the postal addresses further comprises identifying a set of features for each of the plurality of the postal addresses.

3. The method according to claim 2, wherein clustering the plurality of the postal addresses further comprises identifying two or more postal addresses of a predetermined degree of similarity.

4. The method according to claim 3, wherein clustering the plurality of the addresses further comprises, responsive to determining two or more addresses share the predetermined amount of features, assigning the two or more addresses to belong to a cluster.

5. The method according to claim 1, further comprising:
    identifying one or more missing components of a postal address belonging to a cluster; and
    adding the one or more missing components to the postal address belonging to a cluster.

6. The method according to claim 1, wherein standardizing the cluster of postal addresses further comprises computing differences between postal addresses in the cluster of postal addresses via consulting a dictionary.

7. The method according to claim 6, further comprising:
    storing a standardized cluster of postal addresses;
    identifying one or more duplicate postal addresses; and
    de-duplicating the one or more duplicate postal addresses.

8. The method according to claim 1, wherein clustering the plurality of the postal addresses further comprises utilizing a signature based clustering methodology.

9. The method according to claim 8, wherein the signature based clustering methodology further comprises computing a set of signatures for a postal address via shingling, said shingling comprising producing shingles via a moving window.

10. A computer program product comprising:
    a computer readable storage medium having computer readable program code embodied therewith, the computer readable program code comprising:
    computer readable program code configured to access a database having postal addresses stored therein;
    computer readable program code configured to, in response to accessing the database:
        cluster a plurality of the postal addresses based on similarity, and thereby forming at least one cluster of postal addresses; and
        within an identified cluster of postal addresses, identify one or more synonyms relative to one or more components of postal addresses, wherein the one or synonyms comprise variants of the one or more components; and
    computer readable program code configured to, with respect to one or more components of the postal addresses in the identified cluster of postal addresses, identify a standardized identifier from among the one or more synonyms and applying the standardized identifier to postal addresses within the cluster of postal addresses.

11. The computer program product according to claim 10, wherein to cluster the plurality of the addresses further comprises identifying a set of features for each of the plurality of postal addresses.

12. The computer program product according to claim 11, wherein to cluster the plurality of the postal addresses further comprises identifying two or more postal addresses of a predetermined degree of similarity.

13. The computer program product according to claim 12, wherein to cluster the plurality of the postal addresses further comprises, responsive to determining two or more postal addresses share the predetermined amount of features, assigning the two or more postal addresses to belong to a cluster.

14. The computer program product according to claim 10, wherein the computer readable program code further comprises:
    computer readable program code configured to identify one or more missing components of a postal address belonging to a cluster; and
    computer readable program code configured to add the one or more missing components to the postal address belonging to a cluster.

15. The computer program product according to claim 10, wherein to standardize the cluster of postal addresses further comprises computing differences between postal addresses in the cluster of postal addresses via consulting a dictionary.

16. The computer program product according to claim 15, wherein the computer readable program code further comprises:

computer readable program code configured to store a standardized cluster of postal addresses;

computer readable program code configured to identify one or more duplicate postal addresses; and computer readable program code configured to de-duplicate the one or more duplicate postal addresses.

17. The computer program product according to claim 10, wherein to cluster the plurality of the postal addresses further comprises utilizing a signature based clustering methodology.

18. The computer program product according to claim 17, wherein the signature based clustering methodology further comprises computing a set of signatures for a postal address via shingling, said shingling comprising producing shingles via a moving window.

19. An apparatus comprising:

one or more processors; and a memory operatively connected to the one or more processors;

wherein, responsive to execution of computer readable program code accessible to the one or more processors, the one or more processors are configured to:

access a database having a plurality of postal addresses stored therein;

in response to accessing the database:

cluster a plurality of the postal addresses based on similarity, and thereby forming at least one cluster of postal addresses; and within an identified cluster of postal addresses, identify one or more synonyms relative to one or more components of postal addresses, wherein the one or synonyms comprise variants of the one or more components; and computer readable program code configured to, with respect to one or more components of the postal addresses in the identified cluster of postal addresses, identify a standardized identifier from among the one or more synonyms and applying the standardized identifier to postal addresses within the cluster of postal addresses.

20. The apparatus according to claim 19, wherein to standardize the cluster of postal addresses further comprises computing differences between postal addresses in the cluster of postal addresses via consulting a dictionary.

* * * * *